United States Patent
Cao et al.

(10) Patent No.: US 10,314,043 B2
(45) Date of Patent: Jun. 4, 2019

(54) MOBILE TERMINAL AND METHOD FOR DATA TRANSMISSION BY MULTIPLE SIMULTANEOUS RADIO ACCESS TECHNOLOGIES

(71) Applicant: ZTE Wistron Telecom AB, Kista (SE)

(72) Inventors: Aijun Cao, Kista (SE); Yonghong Gao, Kista (SE); Jan Johansson, Kista (SE); Patrick Svedman, Kista (SE); Thorsten Schier, Kista (SE); Bojidar Hadjiski, Kista (SE)

(73) Assignee: ZTE WISTRON TELECOM AB, Kista (SE)

( * ) Notice: Subject to any disclaimer, the term of this patent is extended or adjusted under 35 U.S.C. 154(b) by 0 days.

(21) Appl. No.: 15/211,929

(22) Filed: Jul. 15, 2016

(65) Prior Publication Data

US 2017/0026950 A1    Jan. 26, 2017

Related U.S. Application Data

(60) Provisional application No. 62/194,575, filed on Jul. 20, 2015.

(51) Int. Cl.

| | | |
|---|---|---|
| *H04W 72/04* | (2009.01) | |
| *H04W 88/10* | (2009.01) | |
| *H04L 5/00* | (2006.01) | |
| *H04W 36/00* | (2009.01) | |
| *H04W 36/32* | (2009.01) | |

(Continued)

(52) U.S. Cl.
CPC ......... *H04W 72/048* (2013.01); *H04L 5/0032* (2013.01); *H04W 36/0066* (2013.01); *H04W 36/0072* (2013.01); *H04W 36/32* (2013.01); *H04W 56/0045* (2013.01); *H04W 76/15* (2018.02); *H04W 76/16* (2018.02);

(Continued)

(58) Field of Classification Search
None
See application file for complete search history.

(56) References Cited

U.S. PATENT DOCUMENTS

2009/0290569 A1    11/2009    Wu
2011/0134831 A1    6/2011    Pirskanen
(Continued)

FOREIGN PATENT DOCUMENTS

JP    2014-504474 A    2/2014
JP    2015-510741 A    4/2015
(Continued)

OTHER PUBLICATIONS

Extended European Search Report in European Application No. 16180397.8, dated Dec. 7, 2016, in 13 pages.
(Continued)

*Primary Examiner* — Frantz Bataille
(74) *Attorney, Agent, or Firm* — Duane Morris LLP

(57) ABSTRACT

A mobile terminal, method and non-transitory computer-readable medium for simultaneously utilizing at least two different radio access technologies (RATs). In one embodiment, the mobile terminal includes: at least one processor configured to control and coordinate first and second radio resource control functions corresponding to first and second RATs, respectively; and map a logical channel to first and second transport channels corresponding to the first and second RATs.

23 Claims, 6 Drawing Sheets

(51) Int. Cl.
  *H04W 56/00* (2009.01)
  *H04W 76/16* (2018.01)
  *H04W 76/15* (2018.01)
  *H04W 28/08* (2009.01)
  *H04W 88/06* (2009.01)

(52) U.S. Cl.
  CPC .......... *H04W 88/10* (2013.01); *H04W 28/085* (2013.01); *H04W 88/06* (2013.01)

(56) References Cited

U.S. PATENT DOCUMENTS

| | | | | |
|---|---|---|---|---|
| 2012/0140743 | A1* | 6/2012 | Pelletier | H04W 72/0453 370/335 |
| 2013/0044709 | A1* | 2/2013 | Adjakple | H04W 76/15 370/329 |
| 2013/0329694 | A1 | 12/2013 | Vrzic et al. | |
| 2014/0079031 | A1* | 3/2014 | Parkvall | H04L 5/0058 370/336 |
| 2015/0063295 | A1* | 3/2015 | Himayat | H04W 36/0022 370/331 |
| 2015/0326456 | A1* | 11/2015 | Dudda | H04L 43/062 370/252 |

FOREIGN PATENT DOCUMENTS

| | | |
|---|---|---|
| WO | 2012/074878 A2 | 6/2012 |
| WO | 2013/123343 A1 | 8/2013 |

OTHER PUBLICATIONS

Official Action dated Aug. 17, 2017, in corresponding Japanese Patent Application No. 2016-141260 with English translation.

Official Action dated Aug. 21, 2017, in corresponding Japanese Patent Application No. 2016-141258 with English translation.

Ericsson, "PDCP reordering in dual connectivity", vol. RAN WG2, no. Valencia, Spain; Mar. 31, 2014-Apr. 4, 2014, (Apr. 1, 2014), 3GPP Draft; R2-141760—PDCP Reordering in Dual Connectivity, 3rd Generation Partnership Project (3GPP), Mobile Competence Centre ; 650, Route Des Lucioles ; F-06921 Sophia-Antipolis Cedex ; France, URL: http://www.3gpp.org/ftp/Meetings_3GPP_SYNC/RAN2/Docs/.

Extended European Search Report in European Application No. 16180403.4, dated Feb. 1, 2017, in 14 pages.

* cited by examiner

MOBILE TERMINAL AND METHOD FOR DATA TRANSMISSION BY MULTIPLE SIMULTANEOUS RADIO ACCESS TECHNOLOGIES

RELATED PATENT APPLICATIONS

This application claims benefit of priority under 35 U.S.C. § 119(e) to Provisional Application No. 62/194,575 entitled "Method and System for Data Transmission by Multiple Simultaneous Radio Access Technologies," filed Jul. 20, 2015, which is incorporated by reference herein in its entirety.

FIELD OF THE INVENTION

The present invention relates generally to cellular telecommunication systems, and in particular to systems and methods for using different radio access technologies (RATs) to simultaneously transmit data.

BACKGROUND OF THE INVENTION

After several decades of evolution, e.g., from 2G, 3G and 4G, and now approaching 5G, mobile networks are able to provide billions of mobile users with data transmission service via almost ubiquitous radio access. Different generations of mobile networks have distinguished features, technologies, and even network architectures and protocol stacks. In order to protect the investment of both operators and end users in prior generation technologies, the introduction of each new generation network has supplemented but not replaced previous generation networks. Thus, old and new generation networks co-exist with one another and will continue to co-exist for many years to come. For example, many mobile networks today consist of Global System for Mobile Communications (GSM), Universal Mobile Telecommunications System (UMTS) and Long term Evolution (LTE) systems. Similarly, handsets, or other user equipment (UE) often support multiple modes, each mode utilizing a different RAT.

Though a UE with the capability of supporting multiple modes can communicate using different RATs, only one RAT is active at any given time. In other words, data is transmitted using only one RAT at a time. And if the active RAT cannot meet the demands of the service, then an inter-RAT handover will typically occur.

FIG. 1 illustrates an exemplary state diagram 100, which shows how Radio Resource Control (RRC) status changes with the handover between 3GPP 2G/3G/4G RATs. From a UE's perspective, each RAT works on its own basis independently. For example, in some networks, a voice call via a GSM connection may disconnect a UE from a 4G connection until the voice call ends. The coordination among multiple RATs may only take place at the moment when an inter-RAT handover is intended, even though in many cases, a cell site might support different RATs at the same time due to the limitations in resources, e.g., site acquisition and maintenance costs, etc. Actually, an end user does not need to consider whether it connects to a 2G, 3G or 4G etc. network. The concern of the end user is related to whether the wireless network can provide data services on demand, regardless of the generation of the networks on which the data services are provided.

As illustrated in FIG. 1, RRC is a Radio Resource Control protocol used by RATs such as UMTS and LTE to provide the Air interface for wireless communications. RRC handles the control plane signaling of Layer 3 between the UE and the Radio Access Network (e.g., UTRAN or E-UTRAN) as well as for the radio interface between a Relay Node and the E-UTRAN. This RRC protocol is specified by 3GPP Technical Specification TS 25.331 for UMTS and Technical Specification TS 36.331 for LTE, both of which are incorporated herein in their entireties. RRC messages are typically transported via the Packet Data Convergence Protocol (PDCP).

The primary functions of the RRC protocol include connection establishment and release functions, broadcast of system information, radio bearer establishment, reconfiguration and release, RRC connection mobility procedures, paging notification and release and outer loop power control. By means of the signaling functions, the RRC configures the user and control planes according to the network status and allows for Radio Resource Management strategies to be implemented. The operation of the RRC protocol is typically guided by a state machine which defines certain specific states that a UE may be present in. The different states in this state machine have different amounts of radio resources associated with them and these are the resources that the UE may use when it is present in a given specific state. Since different amounts of resources are available at different states the quality of the service that the user experiences and the energy consumption of the UE are influenced by this state machine.

As illustrated in FIG. 1, exemplary E-UTRA states include a RRC connected state 102 and a RRC idle state 104. The states of the RRC connected state 102, in order of decreasing power consumption, are: a CELL_DCH (Dedicated Channel) state 106, a CELL_FACH (Forward access channel) state 108, and CELL_PCH (Cell Paging channel)/URA_PCH (URA Paging channel) state 110. For example, the power consumption in the CELL_FACH state 108 can be roughly 50 percent of that in the CELL_DCH state 106, and the PCH states 110 use about 1-2 percent of the power consumption of the CELL_DCH state 106. The RRC idle state 104 (i.e., when there is no active connection with a network resource) has the lowest energy consumption and, in the example shown in FIG. 1, includes an UTRA Idle state 112 and a GSM Idle/GRPS Packet Idle state 114. The transitions to lower energy consuming states occur when inactivity timers trigger. For example, a first timer (T1) controls transition from the DCH to FACH state, a second timer (T2) controls transition from the FACH to PCH state, and a third timer (T3) controls transition from the PCH to idle state. Different operators can have different configurations for the inactivity timers, which leads to differences in energy consumption.

In the RRC Idle state 104, a UE can only be located by its tracking area (TA) within the network coverage area, which means that the network is unaware of a specific base station the UE is currently assigned to. After a RRC connection procedure is completed, the UE transitions to the RRC Connected state 102, after which the UE may use dedicated network resources to perform traffic data transfer functions. After completion of data transfer, the UE will transition back to the the RRC Idle state 104 in accordance with a predetermined RRC Connection Release procedure in order reduce energy consumption by the UE. In the example shown in FIG. 1, in the RRC Connected state 102, the UE can transfer data in either a Global Satellite Mobile (GSM) Connected state 116 (utilizing a GSM RAT) or a General Packet Radio Service (GPRS) Packet transfer mode state 118 (utilizing a GPRS packet transfer mode RAT). In a conventional UE or base station that supports duel connectivity, however, only one RAT can be used at any given time.

Dual connectivity introduced in networks such as 3GPP Release 12 (R12) supports operations where a given UE can consume radio resources provided by at least two different network points (e.g., Primary and Secondary eNodeBs), typically connected with a non-ideal backhaul, while in a RRC_CONNECTED state. Thus, the UE can be provided with higher data throughput via a radio bearer split which means the radio bearer is split among multiple E-UTRAN node B's (a.k.a., "evolved Node B" or "eNodeB"). Thus, in conventional networks, dual connectivity is provided by utilizing multiple eNodeBs that operate using the same radio access technology (RAT), e.g., LTE. Additionally, when dual connectivity is provided, the data stream is split at the radio bearer. These techniques result in inefficiencies in utilizing the different RAT's that are supported by networks and UE's today.

FIG. 2 illustrates an Open Systems Interconnection (OSI) model of a conventional UE protocol stack 200, which includes a control plane 202 and a user plane 204. The control plane 202 provides OSI Layer 3 signaling between the UE and the Radio Access Network (UTRAN or E-UTRAN) and includes a Non-Access-Stratum (NAS) layer 206, which controls session management, mobility management and security management. In various embodiments, NAS messages may be transported by the Radio Resource Control (RRC) layer 208 either by being concatenated with other RRC messages or encapsulated as dedicated RRC messages. The RRC layer 208 may be terminated by the eNodeB for 4G network, Radio Network Controller (RNC) for 3G network etc., and in various embodiments, the RRC layer 208 controls system information broadcast, paging, RRC connection between the UE and the network, and point-to-point radio bearers. In various embodiments, the RRC layer 208 is also involved in various mobility functions including but not limited to: UE measurement reporting and control of the reporting for inter-cell, Inter-RAT mobility, UE cell selection/reselection, etc.

The user plane 204 includes an Application (APP) layer 210 and an Internet Protocol (IP) layer 212. The APP layer 210 is the OSI layer closest to the end user operating UE, which means both the APP layer 210 and the user interact directly with a software application running on the UE. Thus, the APP layer 210 interacts with software applications that implement one or more communicating function such as identifying communication partners, determining resource availability, and synchronizing communication. When identifying communication partners, the APP layer 210 determines the identity and availability of communication partners for an application with data to transmit. When determining resource availability, the APP layer 210 decides whether sufficient network resources for the requested communication exist. In synchronizing communication, all communication between applications requires cooperation that is managed by the APP layer 210. Thus, the APP layer 210 supports application and end-user processes. The IP layer 212 provides the principal communications protocol for relaying data across network boundaries. Its routing function enables internetworking, and essentially establishes the Internet. The IP layer 212 has the task of delivering packets from the source host to the destination host solely based on the IP addresses in the packet headers. For this purpose, IP layer 212 defines packet structures that encapsulate the data to be delivered. It also defines addressing methods that are used to label the data with source and destination information.

A PDCP layer 214 provides control plane data to the RRC layer 208 and user plane data to the IP layer 212 of the UE. The PDCP layer 214 can also provide data to base stations (e.g., eNodeBs). The PDCP layer 214 further includes a header compression sublayer or module 216 for providing header compression services to upper layers, a ciphering module 218 for providing ciphering services to the upper layers, and an integrity module 220 for providing data integrity services to the upper layers. The header compression module 216 can utilize known IP header compression protocols (e.g., RFC 2507 or RFC 3095). If PDCP is configured for No Compression it will send the IP Packets without compression; otherwise it will compress the packets according to its configuration by upper layer and attach a PDCP header and send the packet. Different header formats are defined, dependent on the type of data to be transported. The ciphering module 218 ciphers IP data to be sent to the upper layer utilizing known ciphering techniques. The integrity module 220 performs known data integrity and ciphering functions on control messages sent to the RRC layer 208.

Referring still to FIG. 2, a Radio Link Control (RLC) layer 222 transports the PDCP's protocol data units (PDUs). The RLC layer 222 includes a segmentation module 224 that segments each data packet adaptive to the RAT being supported, and supports Transparent Mode (TM), Unacknowledged Mode (UM) and Acknowledged Mode (AM) in various embodiments. For various AM mode embodiments, Automatic Repeat ReQuest (ARQ) is applied for guarantee of data segmentation transmission. The RLC layer 222 further includes an ARQ module 226 that provides error-control for data transmission that uses acknowledgements (messages sent by the receiver indicating that it has correctly received a data frame or packet) and timeouts (specified periods of time allowed to elapse before an acknowledgment is to be received) to achieve reliable data transmission. If the sender does not receive an acknowledgment before the timeout, it usually re-transmits the frame/packet until the sender receives an acknowledgment or exceeds a predefined number of re-transmissions. Depending on the mode, the RLC layer 222 can provide: ARQ error correction, segmentation/concatenation of PDUs, reordering for in-sequence delivery, duplicate detection, etc.

The UE protocol stack 200 further includes a first Medium Access Control (MAC) layer 228n configured for RAT #n, which schedules uplink/downlink data transmission, and performs link adaptation, random access control by means of a first multiplexing module 230n, and makes error correction by means of a first Hybrid Automatic Repeat ReQuest (HARQ) module 232n, in accordance with the RAT #n protocol. The UE protocol stack 200 fur includes a second Medium Access Control (MAC) layer 228k configured for RAT #k, which schedules uplink/downlink data transmission, and performs link adaptation, random access control by means of a second multiplexing module 230k, and makes error correction by means of second Hybrid Automatic Repeat ReQuest (HARQ) module 232k, in accordance with the RAT #k. The MAC layer 228 provides addressing and logical channels to the RLC layer 224 that make it possible for several terminals or network nodes to communicate within a multiple access network that incorporates a shared medium.

The UE protocol stack 200 further includes multiple physical (PHY) layers 234k and 234n, each corresponding to a supported RAT #k and #n. The PHY layer 234 is responsible for the actual transmission over the radio interface and includes a coding and modulation module 236, including channel coding, modulation and the physical signal generation for transmission via physical channels. Note that in the protocol stack 200 of FIG. 2, the mapping between logical channels and transport channels is a 1-to-1 mapping, which is one of the reasons that only one RAT can be active at any one time.

SUMMARY OF THE INVENTION

The invention addresses the above and other needs by providing techniques to simultaneously use multiple RATs.

In accordance with various embodiment, the invention provides a method, a non-transitory computer-readable medium and a mobile terminal that simultaneously supports at least two different radio access technologies (RATs). The mobile terminal includes at least one processor configured to control and coordinate first and second radio resource control functions corresponding to first and second RATs, respectively; and map a logical channel to first and second transport channels corresponding to the first and second RATs.

Further features and advantages of the present invention, as well as the structure and operation of various embodiments of the present invention, are described in detail below with reference to the accompanying drawings.

BRIEF DESCRIPTION OF THE DRAWINGS

The present invention, in accordance with one or more various embodiments, is described in detail with reference to the following Figures. The drawings are provided for purposes of illustration only and merely depict exemplary embodiments of the invention. These drawings are provided to facilitate the reader's understanding of the invention and should not be considered limiting of the breadth, scope, or applicability of the invention. It should be noted that for clarity and ease of illustration these drawings are not necessarily made to scale.

DETAILED DESCRIPTION OF EXEMPLARY EMBODIMENTS

Figure 1:
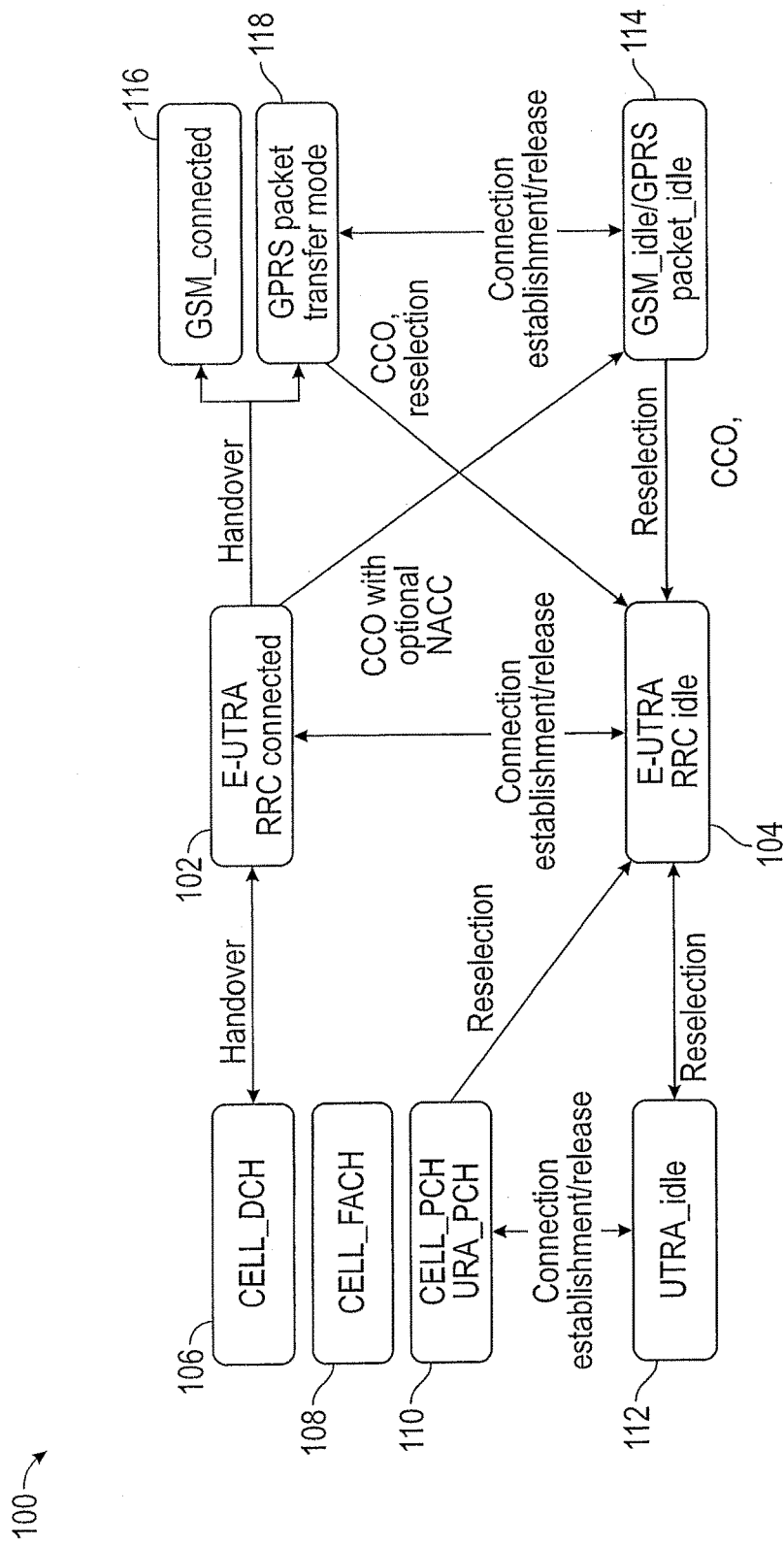
FIG. 1 illustrates an exemplary state diagram showing how Radio Resource Control (RRC) status changes with handover between different Radio Access Technologies (RATs)

The approach is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

In the following description of exemplary embodiments, reference is made to the accompanying drawings which form a part hereof, and in which it is shown by way of illustration of specific embodiments in which the invention may be practiced. It is to be understood that other embodiments may be utilized and structural changes may be made without departing from the scope of the preferred embodiments of the invention.

As discussed above, dual connectivity introduced in networks such as 3GPP R12 supports operations where a given UE can consume radio resources provided by at least two different network points (e.g., Primary and Secondary eNBs), typically connected with non-ideal backhaul, while in a RRC_CONNECTED state. Thus, a UE can be provided with higher data throughput by splitting a radio bearer among multiple eNodeBs, which result in inefficiencies in utilizing the different RAT's supported by the network and the UE. In some embodiments, advantages and differences provided by the disclosed invention with respect to the concept of dual connectivity include:

Dual connectivity is provided by utilizing multiple nodes using different RATs.

Instead of splitting the data stream at the radio bearer layer to provide dual connectivity, according to some embodiments of the invention, the radio stream is split at the Radio Link Control (RLC) layer. Thus different RATs are integrated more efficiently.

In various embodiments, multiple RATs are integrated into one unified efficient network. FIG. 3 illustrates UE protocol stack 300, in accordance with one embodiment of the invention. The protocol stack 300 includes many similar elements as the protocol stack 200 of FIG. 2, which are labeled with the same reference number. In the interest of brevity, these similar elements are not described again with reference to FIG. 3. In one embodiment, the protocol stack 300 includes a Radio Access Control (RAC) layer 302 on top of the RRC layer 208, which includes RRC layers 208$k$ and 208$n$ corresponding to RAT #k and RAT #n supported by the UE protocol stack 300. In the illustrated embodiment of FIG. 3, the RAC layer 302 controls and coordinates RRC components 208$k$ and 208$n$ for each RAT k and n. As used herein the term "component" refers to any circuit, or portion thereof, any processor as defined herein, or portion thereof, configured to perform a corresponding function ascribed to the component. In addition to the aggregate functions provided by the RRC components 208$k$ and 208$n$, the RAC layer 302 also has the following functions:

Controls which RATs a UE simultaneously uses

Controls activation/de-activation of one RRC component

Monitors the service capabilities of each RAT available for a UE corresponding to the current UE position Controls the assignment and distribution of data to be received or transmitted by the UE to different RATs Coordinates among different RRC components in order to make them work more efficiently. For example, the RAC can determine the data transfer format for each RRC component according to the current load and interference conditions of each RAT.

The RAC layer 302 can also have additional functions in other embodiments.

The UE protocol stack 300 further includes a modified RLC layer 304, which includes a Logical-Transport Channels (LTC) mapper sublayer 306, as shown in FIG. 3. In various embodiments, LTC mapper 306 maps logical channels to transport channels in a 1-to-1 or a 1-to-multiple mapping function, which means one logical channel can be mapped to one or more different transport channels with each transport channel corresponding to one active RAT. When transmitting data, each MAC layer 228 sends requests for payload to LTC mapper 306 according to its scheduling grant, and the LTC mapper 306 responds to each MAC layer 228 with data segments having the requested/granted size, and the data segment is encapsulated by RLC headers corresponding to a certain logical channel ID. In various embodiments, data from the same logical channel may be transmitted at the same time by multiple MACs with different RATs. When receiving data, each MAC layer 228 sends decoded transport blocks to the LTC mapper 306, which then de-capsulates each received data segment and distributes it to the corresponding logical channel.

Figure 3:
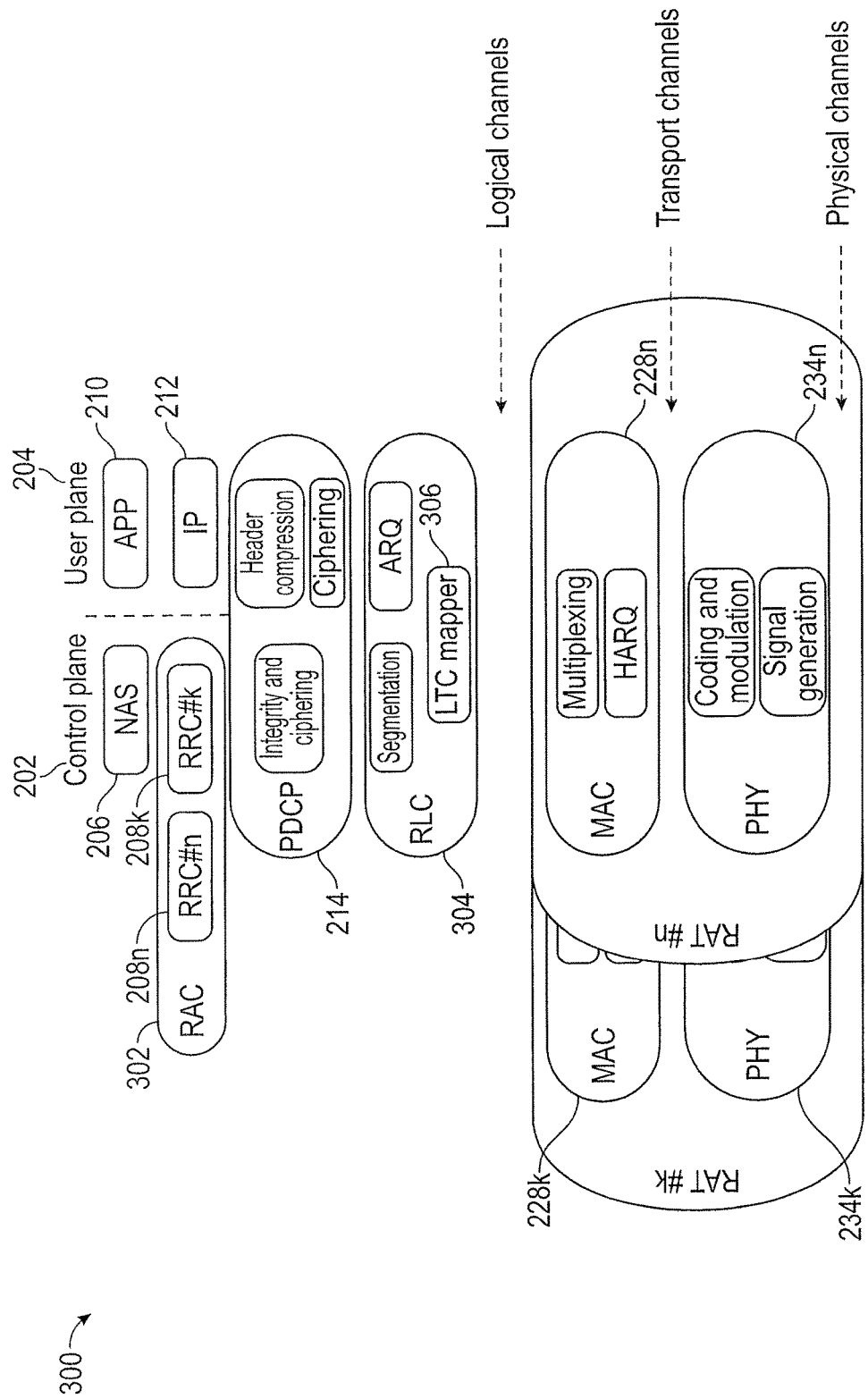
FIG. 3 illustrates an exemplary UE protocol stack, in accordance with one embodiment of the present invention.
Figure 4:
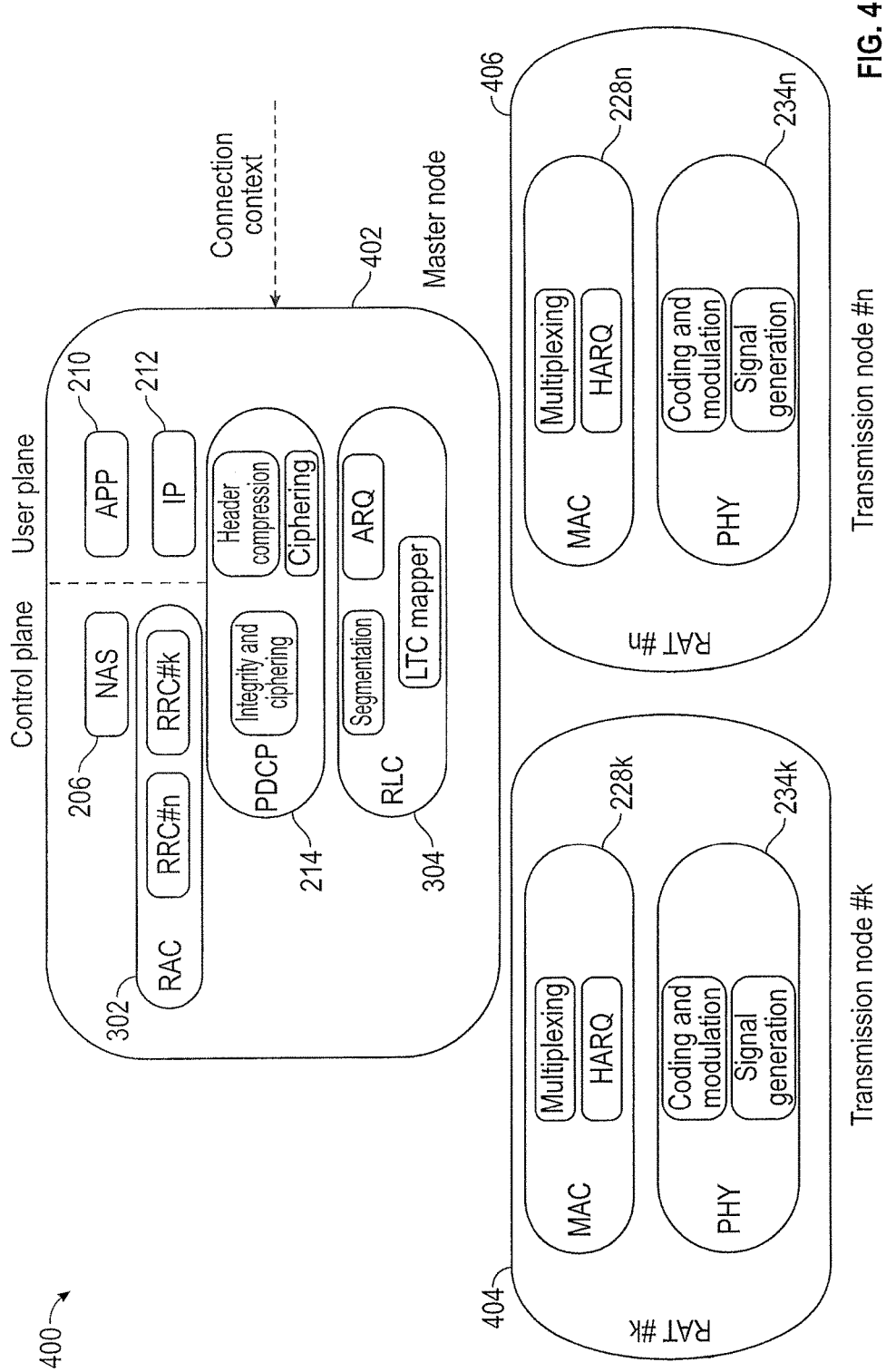
FIG. 4 illustrates an exemplary UE protocol stack, in accordance with another embodiment of the invention.

FIG. 4 illustrates an exemplary UE protocol stack 400 comprising a master node stack 402 and two different transmission node stacks 404 and 406, in accordance with one embodiment of the invention. The components or layers of FIG. 4 are similar to those of FIG. 3 except in FIG. 4, data transmitted using the different RATs (#k and #n) comes from different sites and are separately handled by transmission node stacks 404 and 406, respectively. When data is transmitted to a UE from different sites (e.g., eNodeB's) using different RATs, as indicated in FIG. 4, coordination information must be transferred between the participating sites, which is required by the RAC layers of the UE and/or sites to control and coordinate the RRC components as discussed above. Such coordination requires additional resources (e.g., bandwidth, processing, etc.) and cost in order to transfer and exchange the required coordination information. In contrast, if all RATs are supported within the same physical site, all of the information required for RAC coordination, for example, can be shared among the different RATs without any extra cost due to transferring and exchanging the coordination information between geographically dispersed sites.

As shown in FIG. 4, UE stack 400 includes a master node stack 402, which contains the layers 206, 210, 21, 214, 302 and 304, as discussed above. These layers perform the functions for controlling and coordinating different RRC components supporting different RATs, mapping logical channels to transport channels, etc., as discussed above. Each transmission node stack 404 and 406 includes a MAC layer 228 and PHY layer 234 to perform the same or similar functions as discussed above with respect to data received via a corresponding RAT and transmission node (e.g., #k or #n).

Figure 2:
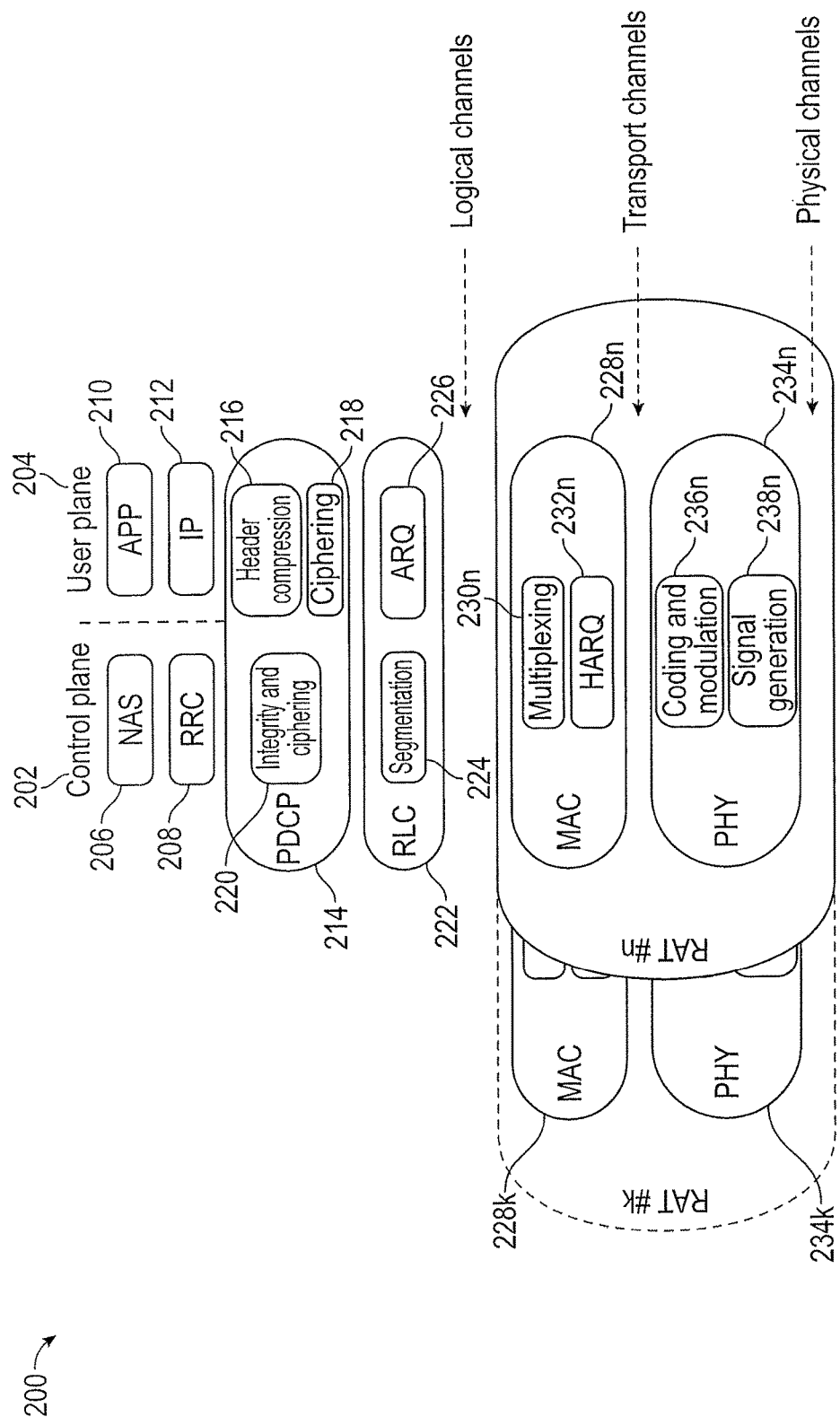
FIG. 2 illustrates an exemplary User Equipment (UE) protocol stack.

In some embodiments, the changes in FIGS. 3 and 4 over FIG. 2, as discussed above, can be applied to UEs as well as other network devices or resources (e.g., base stations, intermediary nodes, etc.) It is appreciated that the modified protocol stacks of FIGS. 3 and 4 and their corresponding functionality can be implemented in corresponding fashion in a base station transceiver ("BST") such as a eNodeB, for example.

Figure 5:
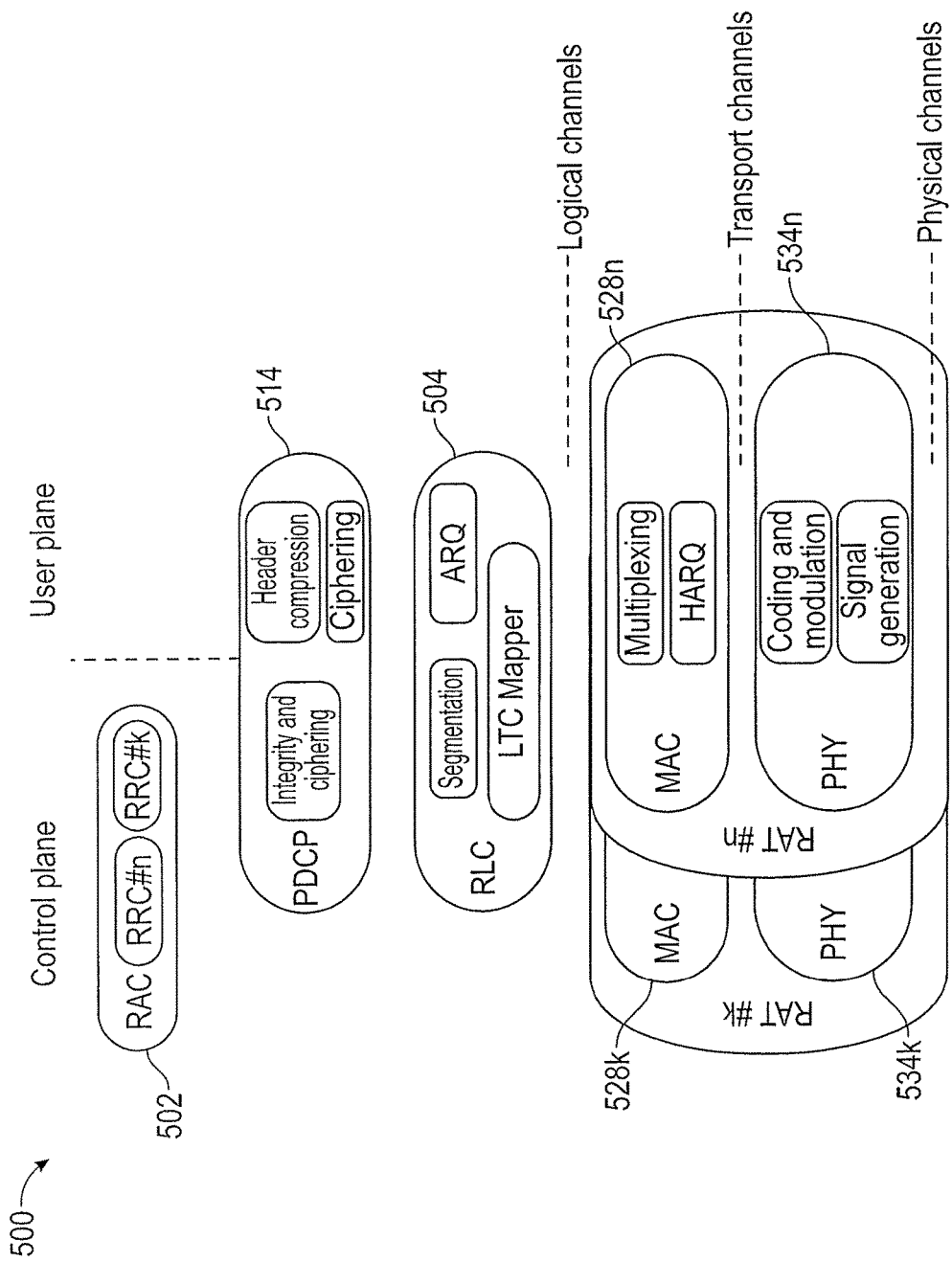
FIG. 5 illustrates an exemplary BST protocol stack, in accordance with one embodiment of the present invention.

FIG. 5 illustrates an exemplary BST protocol stack 500, in accordance with some embodiments of the invention. It is noted that the NAS layer 206, APP layer 210 and IP layer 212 of FIGS. 3 and 4 are not present in the protocol stack 500, since they are not necessary in a BST protocol stack. The BST protocol stack 500 includes; a RAC layer 502, which provides similar functions as the RAC layer 302 of FIGS. 3 and 4, except from a BST perspective; a RLC layer 504 which provides similar functions as the RLC layer 304, except from a BST perspective; a PDCP layer 514 which provides similar functions as the PDCP layer 214, except from a BST perspective; a plurality of MAC layers 528*k* and 528*n* for supporting different RATs k and n, and which provide similar functions as the MAC layers 228*k* and 228*n*, except from a BST perspective; and a plurality of PHY layers 534*k* and 534*n* for supporting different RATs k and n, and which provide similar functions as the PHY layers 234*k* and 234*n*, except from a BST perspective. It is appreciated that a person of ordinary skill in the art can implement complementary functionality in both a UE and a BST based on OSI model layers described herein, without undue experimentation.

Figure 6:
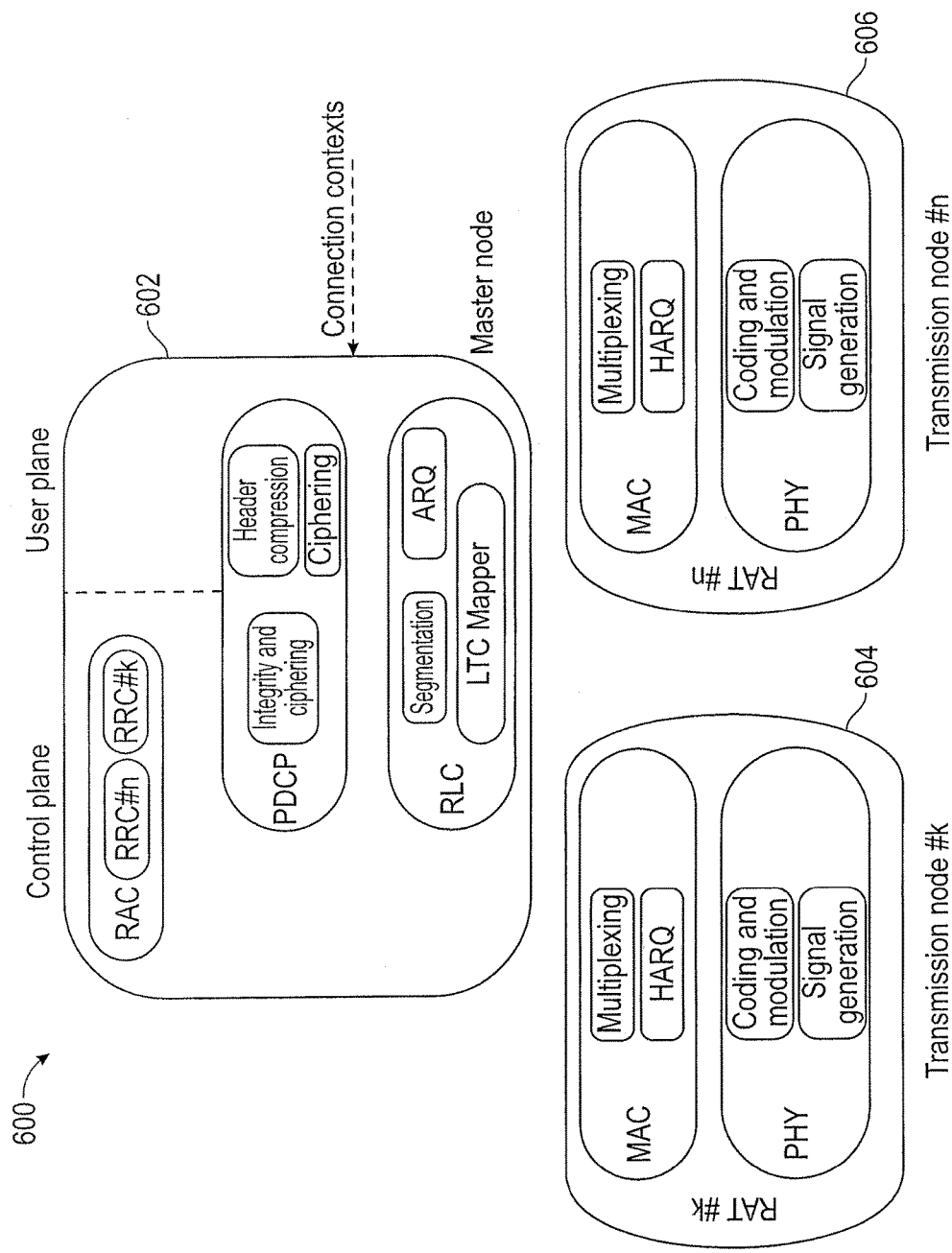
FIG. 6 illustrates an exemplary BST protocol stack, in accordance with another embodiment of the invention.

FIG. 6 illustrates an exemplary BST protocol stack 600 when different RATs are supported by different base stations. The BST protocol stack 600 includes a master node stack 602 that includes similar layers to perform similar functions as the master node stack 402 of Figure, except from the perspective of a BST. It should be further noted that the master node stack 602 omits the NAS, APP and IP layers 206, 210 and 212, respectively, of FIG. 4.

The BST protocol stack 600 further includes transmission node stacks 604 and 606 corresponding to functionality of different transmission nodes (e.g., base stations) that support different RATs #k and #n, respectively. As discussed in further detail below, the master node stack 602 is contained in a master node BST (not shown) which controls and coordinates data transfer for nodes k and n (e.g., two different base stations) operating in accordance with their respective RAT k and n protocols. A primary different between FIG. 6 and FIG. 5, is that in FIG. 5, the master node stack 602, transmission node k stack 602 and transmission node stack n 606 are all supported by the same base station, while in FIG. 6 they are all in separate base stations. Thus, in the protocol of FIG. 6, control messages to/from the master node 602 must be transferred via communication interfaces (e.g., an "X2 interface") among the different transmission nodes n and k.

With the continuing reduction in costs of radio frequency (RF) chipsets, a UE may be equipped with multiple independent RF chains. Once powered on, the UE may be configured to communicate via a default RAT via a default RF chain. The base station providing the default RAT may also support other RATs at the same time. According to some embodiments, when the UE attaches to the network, the following functions may be performed:

1) The RAC layer activates the RRC component corresponding to the default RAT.
2) The RAC layer determines whether another RAT is available to the UE based on one or more criteria, e.g., interference and load of this RAT network, the service requirements of the UE, the priority class of the UE, the UE mobility, network energy efficiency policies, UE energy efficiency and power consumption policy, the current position of the UE if possible, etc.
3) The RAC layer instructs the UE to access the new RAT with the necessary information so as to make the UE's access more efficient and quick, e.g. non-contention based random access.
4) The RAC layer activates the RRC component corresponding to the new RAT once the access procedure is finished.
5) The RAC layer re-configures the radio link with a new MAC layer and PHY layer as a radio link branch corresponding to the new RAT.
6) The LTC mapper then re-configures the mapping between logical channels and transport channels.
7) Steps 2 to 6 may be repeated until there is no other RAT available to the UE, or until the UE service/performance requirements can be met.

According to some embodiments, when the UE initiates communication,

1) The RAC layer checks the current capabilities for each active RAT connection.

2) The RAC layer coordinates the schedulers of active RATs and each radio link branch starts to work accordingly.

According to other embodiments of the disclosed invention, in the case where a UE has only one RF chain, similar procedures can be performed except that different RATs share the same RF chain by multiplexing data from the different RATs in the time domain. In some embodiments, multiple RATs can be served by several base stations from different sites. However, only one of the base stations serve as the master node which contains a set of so-called "connection contexts" to provide an anchor point of the mobile network from the perspective of core network, which terminates at the RLC layer 304. Besides the master node, there may be multiple transmission nodes which correspond to each type of RAT, respectively.

The master node contains the connection contexts to serve as an anchor for the network. It should be noted that a master node may also act as one of the transmission nodes. The following exemplary issues are addressed by the architectures shown in FIGS. 4 and 6:

1) Adaptation to different back-haul latencies between the transmission nodes and the master node: each transmission node transmits one segment independently from the same RLC layer in this embodiment. In one embodiment, this issue is solved by letting the master node adjust the RLC assembly window size in order to adapt to the different back-haul latency to the different transmission nodes.

2) Connection contexts hand-over: in some embodiments, if necessary, the connection contexts may be handed over to a new master node. Note that the new master node can be one of the existing transmission nodes, or even a completely new node different from all of the existing transmission nodes, or other nodes in other embodiments.

In various embodiments, the UE is a mobile terminal such as a smart phone. When a mobile terminal engaged in a call moves away from a cell site or Base transceiver station (BTS) and its signal weakens, the Base Station Controller (BSC) or Radio Network Controller (RNC) will automatically instruct the mobile terminal to tune to a different frequency, one assigned to a newly entered BTS coverage area. This process is called handoff. The BSC/RNC determines when handoff should take place by analyzing measurements of radio signal strength made by the present controlling cell site and by its neighbors. In 2G networks, there is one type of network controller called a BSC (Base Station Controller). Similarly in 3G networks, there is one type of network controller called a RNC (Radio Network Controller). Both BSC and RNC control a certain number of base stations. In a 2G system or 3G system before 3GPP Release 6, a base station usually acts as a pure physical layer (PHY) while leaving higher layer functions to be performed by the BSC. In a 3G system after 3GPP Release 6, one base station implements both PHY and MAC layer functions. The scheme provided in the disclosed embodiments above differs fundamentally from conventional BSC/RNC schemes for at least the following reasons:

1. According to some embodiments, there is no extra type of network element similar to BSC/RNC required. Ordinary base stations or nodes can act as a master node.

2. According to some embodiments, a master node is not static from a UE's perspective, and the nodes controlled by it are dynamically changed with the roaming of the UE. This is not the case in 2G/3G.

3. According to some embodiments, a master node combines different data streams together into one data transmission service provided to the higher layer, and different data streams may have different transmission formats.

While one or more embodiments of the invention have been described above, it should be understood that they have been presented by way of example only, and not by way of limitation. Likewise, the various figures or diagrams may depict an example architectural or other configuration for the disclosure, which is done to aid in understanding the features and functionality that can be included in the disclosure. The disclosure is not restricted to the illustrated example architectures or configurations, but can be implemented using a variety of alternative architectures and configurations.

Although functions described herein are described in the context of Open System Interconnect (OSI) model layers, one of ordinary skill in the art will recognize that the functions described herein can be performed by one or more processors contained in the UE and/or a BST having corresponding BST functions. Thus, one or more of the functions described in this document may be performed by an appropriately configured processor. In accordance with various embodiments, the processor may be implemented as a single integrated circuit (IC) or as multiple communicatively coupled IC's and/or discrete circuits. It is appreciated that the processor can be implemented in accordance with various known technologies. In one embodiment, the processor includes one or more circuits or units configurable to perform one or more functions or processes described herein by executing instructions stored in an associated memory, for example. In other embodiments, the processor may be implemented as firmware (e.g., discrete logic components) configured to perform one or more functions or processes described herein. For example, in accordance with various embodiments, the processor may include one or more controllers, microprocessors, microcontrollers, application specific integrated circuits (ASICs), digital signal processors, programmable logic devices, field programmable gate arrays, or any combination of these devices or structures, or other known devices and structures, to perform the functions described herein.

Additionally, one or more of the functions described in this document may be performed by means of computer program code that is stored in a "computer program product", "computer-readable medium", and the like, which is used herein to generally refer to media such as, memory storage devices, or storage unit. These, and other forms of computer-readable media, may be involved in storing one or more instructions for use by processor to cause the processor to perform specified operations. Such instructions, generally referred to as "computer program code" (which may be grouped in the form of computer programs or other groupings), which when executed, enable the computing system to perform the desired operations.

It will be appreciated that, for clarity purposes, the above description has described embodiments of the invention with reference to different functional layers or modules. However, it will be apparent that any suitable distribution of functionality between different functional units, processors or domains may be used without departing from the invention. For example, functionality illustrated to be performed by separate units, processors or controllers may be performed by the same unit, processor or controller. Hence, references to specific functional units are only to be seen as references to suitable means for providing the described functionality, rather than indicative of a strict logical or physical structure or organization.

Additionally, although the invention is described above in terms of various exemplary embodiments and implementations, it should be understood that the various features and functionality described in one or more of the individual embodiments are not limited in their applicability to the particular embodiment with which they are described, but instead can be applied, alone or in some combination, to one or more of the other embodiments of the invention, whether or not such embodiments are described and whether or not such features are presented as being a part of a described embodiment. Thus the breadth and scope of the present invention should not be limited by any of the above-described exemplary embodiments but instead be given the scope commensurate with the plain and ordinary meaning of the claims.

What is claimed is:

1. A mobile terminal that supports at least two different radio access technologies (RATs), comprising:
   at least one processor configured to:
   coordinate first and second radio resource control functions corresponding to a first RAT and a second RAT, respectively;
   map a logical channel to first and second transport channels corresponding to the first RAT and the second RAT;
   communicate with a master node for a network utilizing the first RAT, wherein the first RAT is a default RAT of the mobile terminal; and
   initiate communication with the master node utilizing the second RAT simultaneously with the first RAT based on at least one predetermined criterion, wherein the master node comprises connection contexts to provide an anchor point of the network, and wherein the master node coordinates communication from different transmission nodes utilizing different RATs, respectively.

2. The mobile terminal of claim 1, wherein the at least one processor is further configured to split a data stream by a radio link control (RLC) process executed by the at least one processor.

3. The mobile terminal of claim 2, wherein the at least one processor is further configured to execute first and second media access control (MAC) processes corresponding to the first and second RATs, respectively, to simultaneously transmit data from one logical channel in accordance with the first and second RATs.

4. The mobile terminal of claim 3 wherein data transmitted in accordance with each of the first and second RATs is transmitted as data segments having a requested size, each data segment being encapsulated by a radio link control header corresponding to a logical channel identification value (ID).

5. The mobile terminal of claim 1 wherein, when receiving data, the at least one processor is further configured to:
   receive decoded data segments transmitted in accordance with the first and second RATs;
   de-capsulate each received data segment; and
   distribute each de-capsulated data segment to a corresponding logical channel.

6. The mobile terminal of claim 1 wherein the first and second transport channels are configured to transmit and receive data to and from a first base station corresponding to the first RAT and a second base station corresponding to the second RAT, respectively.

7. The mobile terminal of claim 1 wherein the at least one processor is further configured to control which RATs the mobile terminal uses simultaneously.

8. A method of simultaneously using at least two different radio access technologies (RATs) by a mobile terminal, the method comprising:
   coordinating first and second radio resource control functions corresponding to a first RAT and a second RAT, respectively;
   mapping a logical channel to first and second transport channels corresponding to the first RAT and the second RAT;
   communicating with a master node for a network utilizing the first RAT, wherein the first RAT is a default RAT of the mobile terminal; and
   initiating communication with the master node utilizing the second RAT simultaneously with the first RAT based on at least one predetermined criterion, wherein the master node comprises connection contexts to provide an anchor point of the network, and wherein the master node coordinates communication from different transmission nodes utilizing different RATs, respectively.

9. The method of claim 8 further comprising splitting a data stream by a radio link control (RLC) process.

10. The method of claim 8 further comprising executing first and second media access control (MAC) processes corresponding to the first and second RATs, respectively, to simultaneously transmit data from one logical channel in accordance with the first and second RATs.

11. The method of claim 8 wherein data transmitted in accordance with each of the first and second RATs is transmitted as data segments having a requested size, each data segment being encapsulated by a radio link control header corresponding to a logical channel identification value (ID).

12. The method of claim 11 wherein, when receiving data, the method further comprises:
   receiving decoded data segments transmitted in accordance with the first and second RATs;
   de-capsulating each received data segment; and
   distributing each de-capsulated data segment to a corresponding logical channel.

13. The method of claim 8 wherein the first and second transport channels are configured to transmit and receive data to and from a first base station corresponding to the first RAT and a second base station corresponding to the second RAT, respectively.

14. The method of claim 8 further comprising controlling assignment and distribution of data to be received or transmitted by the mobile terminal to different RATs.

15. A non-transitory computer-readable medium storing computer-executable instructions that when executed perform a method of simultaneously using at least two different radio access technologies (RATs) by a mobile terminal, the method comprising:
   coordinating first and second radio resource control functions corresponding to a first RAT and a second RAT, respectively;
   mapping a logical channel to first and second transport channels corresponding to the first RAT and the second RAT;
   communicating with a master node for a network utilizing the first RAT, wherein the first RAT is a default RAT of the mobile terminal; and
   initiating communication with the master node utilizing the second RAT simultaneously with the first RAT based on at least one predetermined criterion, wherein the master node comprises connection contexts to provide an anchor point of the network, and wherein the master node coordinates communication from different transmission nodes utilizing different RATs, respectively.

16. The non-transitory computer-readable medium of claim 15, wherein the method further comprises splitting a data stream by a radio link control (RLC) process.

17. The non-transitory computer-readable medium of claim 15, wherein the method further comprises executing first and second media access control (MAC) processes corresponding to the first and second RATs, respectively, to simultaneously transmit data from one logical channel in accordance with the first and second RATs.

18. The non-transitory computer-readable medium of claim 15, wherein data transmitted in accordance with each of the first and second RATs is transmitted as data segments having a requested size, each data segment being encapsulated by a radio link control header corresponding to a logical channel identification value (ID).

19. The non-transitory computer-readable medium of claim 15, wherein, when receiving data, the method further comprises:

receiving decoded data segments transmitted in accordance with the first and second RATs;
de-capsulating each received data segment; and
distributing each de-capsulated data segment to a corresponding logical channel.

20. The non-transitory computer-readable medium of claim 15, wherein the first and second transport channels are configured to transmit and receive data to and from a first base station corresponding to the first RAT and a second base station corresponding to the second RAT, respectively.

21. The non-transitory computer-readable medium of claim 15, wherein the method further comprises controlling assignment and distribution of data to be received or transmitted by the mobile terminal to different RATs.

22. The mobile terminal of claim 1, wherein the master node is further configured to adjust a radio link control (RLC) assembly window size to adapt to different back-haul latencies associated with the different transmission nodes, respectively.

23. The mobile terminal of claim 1, wherein the mobile terminal uses a single radio frequency (RF) chain.

* * * * *